(12) United States Patent
Bodin et al.

(10) Patent No.: US 8,275,665 B2
(45) Date of Patent: *Sep. 25, 2012

(54) MONITORING UNIT DEPLETION IN AN INDEPENDENT REAL-TIME MASS STORAGE UNIT SYSTEM BY USING AN ESTIMATED TARE MASS OF THE ITEM

(75) Inventors: William K. Bodin, Austin, TX (US); Michael L. Masterson, Austin, TX (US); Stephen J. Watt, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/049,546

(22) Filed: Mar. 16, 2011

(65) Prior Publication Data

US 2011/0163846 A1 Jul. 7, 2011

Related U.S. Application Data

(63) Continuation of application No. 11/467,214, filed on Aug. 25, 2006, now Pat. No. 7,937,289.

(51) Int. Cl.
*G06G 1/14* (2006.01)
*G06Q 20/00* (2006.01)
(52) U.S. Cl. ............ 705/22; 705/23; 705/28; 235/440; 702/173
(58) Field of Classification Search ............ None
See application file for complete search history.

(56) References Cited

U.S. PATENT DOCUMENTS

| | | | |
|---|---|---|---|
| 4,093,032 A | 6/1978 | Uyama et al. | |
| 4,563,739 A | 1/1986 | Gerpheide et al. | |
| 4,627,504 A | 12/1986 | Moran | |
| 4,964,053 A | 10/1990 | Humble | |
| 5,014,798 A | 5/1991 | Glynn | |
| 5,335,509 A | 8/1994 | Namisniak et al. | |
| 5,418,334 A | 5/1995 | Williams | |
| 5,487,276 A | 1/1996 | Namisniak et al. | |
| 5,671,362 A * | 9/1997 | Cowe et al. ............ | 705/28 |

(Continued)

FOREIGN PATENT DOCUMENTS

JP 08128881 A 3/2011

(Continued)

OTHER PUBLICATIONS

USPTO Notice of allowance for U.S. Appl. No. 11/467,203 dated May 27, 2011.

(Continued)

*Primary Examiner* — Luna Champagne
(74) *Attorney, Agent, or Firm* — Yee & Associates, P.C.; David A. Mims, Jr.

(57) ABSTRACT

Embodiments of the present invention provide a computer implemented method, apparatus, and computer program product for estimating, refining, and using the tare mass for an item to determine and monitor item depletion. In response to detecting an initial presence of an item in the storage unit, a controller collects data about the item. The controller then searches a database for a recorded item containing the same item identification. The tare mass of the item is set equal to the refined tare mass of the recorded item retrieved from the database. The tare mass is then used to calculate a depletion threshold for the item.

22 Claims, 7 Drawing Sheets

U.S. PATENT DOCUMENTS

| | | | |
|---|---|---|---|
| 5,711,160 | A | 1/1998 | Namisniak et al. |
| 5,726,880 | A | 3/1998 | Bailey et al. |
| 5,920,261 | A | 7/1999 | Hughes et al. |
| 6,032,128 | A | 2/2000 | Morrison et al. |
| 6,089,498 | A | 7/2000 | Sticht |
| 6,101,826 | A | 8/2000 | Bessler |
| 6,158,381 | A | 12/2000 | Bray |
| 6,204,763 | B1 | 3/2001 | Sone |
| 6,327,576 | B1 | 12/2001 | Ogasawara |
| 6,393,848 | B2 | 5/2002 | Roh et al. |
| 6,453,687 | B2 | 9/2002 | Sharood et al. |
| 6,481,602 | B1 | 11/2002 | Fritze et al. |
| 6,519,963 | B2 | 2/2003 | Maeda |
| 6,552,663 | B2 | 4/2003 | Swartzel et al. |
| 6,693,539 | B2 | 2/2004 | Bowers et al. |
| 6,741,236 | B2 | 5/2004 | Yun |
| 6,755,031 | B2 | 6/2004 | Cho et al. |
| 6,758,397 | B2 | 7/2004 | Catan |
| 6,859,745 | B2 | 2/2005 | Carr et al. |
| 6,892,545 | B2 | 5/2005 | Ishikawa et al. |
| 6,919,795 | B2 | 7/2005 | Roseen |
| 6,950,095 | B2 | 9/2005 | Kim et al. |
| 6,975,910 | B1 | 12/2005 | Brown et al. |
| 6,982,640 | B2 | 1/2006 | Lindsay et al. |
| 7,009,519 | B2 | 3/2006 | Leonard et al. |
| 7,017,359 | B2 | 3/2006 | Kim et al. |
| 7,027,958 | B2 | 4/2006 | Singh et al. |
| 7,032,408 | B2 | 4/2006 | Dentella et al. |
| 7,040,455 | B2 | 5/2006 | Bogat |
| 7,044,370 | B2 | 5/2006 | Bellis et al. |
| 7,053,773 | B2 | 5/2006 | McGarry et al. |
| 7,065,501 | B1 | 6/2006 | Brown et al. |
| 7,096,221 | B2 | 8/2006 | Nakano |
| 7,158,035 | B2 | 1/2007 | Sakamoto et al. |
| 7,182,259 | B2 | 2/2007 | Lubow et al. |
| 7,340,414 | B2 | 3/2008 | Roh et al. |
| 7,378,968 | B2 | 5/2008 | Wang et al. |
| 7,382,267 | B2 | 6/2008 | Brendley et al. |
| 7,495,561 | B2 | 2/2009 | Bodin et al. |
| 7,518,516 | B2 | 4/2009 | Azevedo et al. |
| 7,535,337 | B2 | 5/2009 | Overhultz et al. |
| 7,648,065 | B2 | 1/2010 | Marino |
| 7,663,497 | B2 | 2/2010 | Chishima et al. |
| 7,673,464 | B2 | 3/2010 | Bodin et al. |
| 7,680,691 | B2 | 3/2010 | Kimball et al. |
| 7,682,830 | B2 | 3/2010 | Prusik et al. |
| 7,716,935 | B2 | 5/2010 | Kim et al. |
| 7,844,509 | B2 | 11/2010 | Bodin et al. |
| 7,930,221 | B2 | 4/2011 | Brown et al. |
| 7,961,104 | B2 | 6/2011 | Bodin et al. |
| 8,055,555 | B2 | 11/2011 | Todd et al. |
| 2002/0003531 | A1 | 1/2002 | Kim et al. |
| 2002/0026325 | A1 | 2/2002 | Hirahara et al. |
| 2002/0066279 | A1 | 6/2002 | Kiyomatsu |
| 2002/0139848 | A1 | 10/2002 | Catan |
| 2002/0143624 | A1 | 10/2002 | Catan |
| 2002/0157411 | A1 | 10/2002 | Ishikawa et al. |
| 2002/0178066 | A1 | 11/2002 | Roh et al. |
| 2003/0014323 | A1 | 1/2003 | Scheer |
| 2003/0015585 | A1 | 1/2003 | Wike et al. |
| 2003/0061129 | A1 | 3/2003 | Todd et al. |
| 2004/0009465 | A1 | 1/2004 | Luckanatinvong |
| 2004/0031274 | A1 | 2/2004 | Cho et al. |
| 2004/0035123 | A1 | 2/2004 | Kim et al. |
| 2004/0100380 | A1 | 5/2004 | Lindsay et al. |
| 2004/0253733 | A1 | 12/2004 | Prusik et al. |
| 2004/0254759 | A1 | 12/2004 | Kubach et al. |
| 2005/0008539 | A1 | 1/2005 | Matsuura et al. |
| 2005/0082376 | A1 | 4/2005 | Lubow et al. |
| 2005/0086108 | A1 | 4/2005 | Sakamoto et al. |
| 2005/0132725 | A1 | 6/2005 | Menten et al. |
| 2005/0155372 | A1 | 7/2005 | Dentella et al. |
| 2005/0171854 | A1 | 8/2005 | Lyon |
| 2005/0258961 | A1 | 11/2005 | Kimball et al. |
| 2006/0006999 | A1 | 1/2006 | Walczyk et al. |
| 2006/0055530 | A1 | 3/2006 | Wang et al. |
| 2006/0119484 | A1 | 6/2006 | Chishima et al. |
| 2006/0171570 | A1 | 8/2006 | Brendley et al. |
| 2006/0178947 | A1 | 8/2006 | Zsigmond et al. |
| 2006/0190363 | A1 | 8/2006 | Brown et al. |
| 2006/0199155 | A1 | 9/2006 | Mosher |
| 2006/0210115 | A1 | 9/2006 | Nemet |
| 2006/0237427 | A1 | 10/2006 | Logan |
| 2007/0016852 | A1 | 1/2007 | Kim et al. |
| 2007/0035380 | A1 | 2/2007 | Overhultz et al. |
| 2007/0046552 | A1 | 3/2007 | Marino |
| 2007/0103304 | A1 | 5/2007 | Newton et al. |
| 2007/0251521 | A1 | 11/2007 | Schackmuth et al. |
| 2008/0047282 | A1 | 2/2008 | Bodin et al. |
| 2008/0052001 | A1 | 2/2008 | Bodin et al. |
| 2008/0052037 | A1 | 2/2008 | Bodin et al. |
| 2008/0052200 | A1 | 2/2008 | Bodin et al. |
| 2008/0052201 | A1 | 2/2008 | Bodin et al. |
| 2008/0052202 | A1 | 2/2008 | Bodin et al. |
| 2008/0055084 | A1 | 3/2008 | Bodin et al. |
| 2008/0094214 | A1 | 4/2008 | Azevedo et al. |
| 2009/0099943 | A1 | 4/2009 | Bodin et al. |

FOREIGN PATENT DOCUMENTS

| | | | |
|---|---|---|---|
| WO | 2005015510 A1 | 2/2005 | |

OTHER PUBLICATIONS

Scher, "RFID Shelf Antennas Featuring Dynasys de-Q Tuning", pp. 1-7, retrieved May 30, 2006 http://rfidusa.com/superstore/product_info.php?cPath=21_39_60&products_id=223.

Lindsay et al., "Retial RFID Systems Without Smart Shelves", 2003, pp. 1-13, retrieved May 30, 2006 http://www.jefflindsay.com/rfid1.shtml.

Gilbert, "Major retailers to test smart shelves", ZDNet News: Jan. 8, 2003, pp. 1-6, retrieved May 31, 2006 http://news.zdnetcom/2100-9584_22-979710.html.

"itag", iTAG RRID—Smart Shelf, AC/Corporation, pp. 1-2, 2003-2006, retrieved May 12, 2006, http://www.ac-corporation.com.ph/products/iTAG/solutions/shelves.asp.

"Automated Livestock management with RFID-Driven Production Systems—15 Years of Work Applying RFID Technology to the Real World", Osborne Industries Inc., 2005, pp. 1-26.

USPTO Office Action for U.S. Appl. No. 11/467,187 dated Mar. 9, 2009.

USPTO Notice of Allowance for U.S. Appl. No. 11/467,187 dated Oct. 21, 2009.

USPTO Office Action for U.S. Appl. No. 11/467,190 dated Aug. 12, 2010.

USPTO Final Office Action for U.S. Appl. No. 11/467,190 dated Apr. 19, 2010.

USPTO Office Action for U.S. Appl. No. 11/467,195 dated Sep. 10, 2008.

USPTO Final Office Action for U.S. Appl. No. 11/467,195 dated Mar. 4, 2009.

USPTO Office Action for U.S. Appl. No. 11/467,195 dated Jul. 27, 2009.

USPTO Notice of Allowance for U.S. Appl. No. 11/467,195 dated Feb. 5, 2010.

USPTO Notice of Allowance for U.S. Appl. No. 11/467,195 dated Jul. 23, 2010.

USPTO Office Action for U.S. Appl. No. 11/467,200 dated Sep. 11, 2008.

USPTO Final Office Action for U.S. Appl. No. 11/467,200 dated Mar. 10, 2009.

USPTO Notice of Allowance for U.S. Appl. No. 11/467,200, dated Aug. 12, 2009.

USPTO Office Action for U.S. Appl. No. 11/467,203 dated Oct. 21, 2008.

USPTO Final Office Action for U.S. Appl. No. 11/467,203 dated Mar. 26, 2009.

USPTO Office Action for U.S. Appl. No. 11/467,214 dated Sep. 2, 2009.

USPTO Final Office Action for U.S. Appl. No. 11/467,214 dated Mar. 18, 2010.

USPTO Office Action for U.S. Appl. No. 11/467,214 dated Jul. 21, 2010.

USPTO Notice of Allowance for U.S. Appl. No. 11/467,214 dated Dec. 28, 2010.
USPTO Office Action for U.S. Appl. No. 11/467,224 dated Jun. 27, 2008.
USPTO Notice of Allowance for U.S. Appl. No. 11/467,224 dated Sep. 22, 2008.
USPTO Office Action for U.S. Appl. No. 12/341,884 dated Oct. 21, 2010.
USPTO Notice of Allowance for U.S. Appl. No. 12/341,884 dated Feb. 9, 2011.
USPTO Office Action regarding U.S. Appl. No. 11/467,190, dated Jun. 22, 2011.
USPTO Notice of Allowance regarding U.S. Appl. No. 11/467,190, dated Nov. 8, 2011.
USPTO Appeal Brief regarding U.S. Appl. No. 11/467,200, dated Apr. 28, 2009.
USPTO Appeal Brief regarding U.S. Appl. No. 11/467,203, dated Apr. 24, 2009.
USPTO Examiner's Answer regarding U.S. Appl. No. 11/467,203, dated Aug. 13, 2009.
USPTO Decision on Appeal regarding U.S. Appl. No. 11/467,203, dated May 2, 2011.

* cited by examiner

MONITORING UNIT DEPLETION IN AN INDEPENDENT REAL-TIME MASS STORAGE UNIT SYSTEM BY USING AN ESTIMATED TARE MASS OF THE ITEM

This application is a continuation of application Ser. No. 11/467,214 filed Aug. 25, 2006, now U.S. Pat. No. 7,937,289 issued May 3, 2011.

BACKGROUND

1. Field

The present invention relates generally to an improved data processing system and in particular to a method and apparatus for detecting real-time depletion of an item within a storage unit. Still more particularly, the present invention is directed to a computer implemented method, an apparatus, and a computer program product for obtaining, refining, and using a tare mass to track item depletion in an independent real-time mass monitoring system.

2. Description

Inventory systems utilizing identification tags, such as universal product codes (UPC) and Radio Frequency identification (RFID) tags placed on product containers may be used to determine what items are present on a given shelf in a retail store. These systems are sometimes referred to as "smart shelves." Smart shelves utilize one or more RFID tag readers to identify products based on a unique identification code provided via an RFID tag on the product package. However, these RFID tags only provide information regarding the presence of an item on a retail store shelf. Current inventory systems do not provide information regarding the mass depletion of each item on the shelf. In other words, smart shelves enable users to track stock depletion rather than mass depletion of an individual item.

In calculating the unit depletion of product within a container, it is helpful to have the tare mass, or empty mass, of the item's container. The tare mass of the item subtracted from the mass of the item is the non-depleted mass of the item's product. However, the tare mass is often unknown, making the depleted mass of the item uncertain. Tare mass values vary widely between types of products, even within identical product groups. The tare mass may be obtained by emptying the entire item product from the item container and then measuring the container. This is often not a practical or convenient solution.

Another method of determining a tare mass is by obtaining the tare mass from the manufacturer of the item. However, the manufacturer may not disseminate tare mass data or have accurate information as to a tare mass of a product container. If a new product container has been deployed, different regions and stores may receive a new product container at different times. The stores may contain mixed old and new product containers for differing periods, making the tare mass of the item uncertain. In addition, the system may not have access to a database that contains the tare mass for each item stored in the system.

SUMMARY

The illustrative embodiments provide a computer implemented method, apparatus, and computer program product for estimating, refining, and using the tare mass of an item to determine and monitor item depletion. In response to detecting an initial presence of an item in the storage unit, a controller collects data about the item. The controller then searches a database for a recorded item containing the same item identification. The tare mass of the item is set equal to the refined tare mass of the recorded item retrieved from the database. The tare mass is then used to calculate a depletion threshold for the item.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Households, businesses, and industries frequently store a variety of consumable items that are depleted through regular or sporadic use. These items are generally stored in storage units located on site or at remote locations. As used herein, a storage unit is an appliance, room, or repository having shelves or compartments for storing or displaying consumable items. A storage unit includes, but is not limited to, a refrigeration unit, a pantry, a storeroom, a cabinet, a set of shelves, a cupboard, a boxcar or trailer, and/or any other compartment or container having space for storing and/or displaying items.

A storage unit system is a storage unit that is connected to a network. A global storage unit system is a storage unit system that is connected to a global network. A global storage unit system may be able to monitor mass depletion of items in the system by accessing information such as the non-depleted mass or net weight of the item. An independent storage unit system is a system that is not connected to a global network. An independent storage unit system may only have access to the data that is contained within the independent storage unit system. Therefore, the non-depleted or net weight of the item may not be readily accessible to the storage unit system.

As used herein, an item includes the product and the container in which the product is packaged. For example, an item may comprise a product, such as the liquid soap, and the container, which is the bottle. Thus, there is an item mass, a product mass, and a container mass. The container mass is called the tare mass. Using the example above, a bottle of liquid soap is an item, the item mass is the mass of the liquid soap and the bottle, the product mass is the mass of the liquid soap, and, the tare mass is the mass of the empty bottle. An item includes, but is not limited to, an individual consumable product in a single container, multiple consumable products in a single container, a carton or case of multiple containers, a pallet of multiple cartons or cases, and/or a load, such as a truckload, shipload, or railcar load, having multiple pallets. As used herein, a container is any disposable or reusable package, receptacle, carton, can, jar, or any other object to hold, carry, or enclose one or more items for transport and/or storage.

Items in an inventory may be identified using an identification system such as a Universal Product Code (UPC) barcode or Radio Frequency identification (RFID) tag. A Universal Product Code (UPC) is a machine readable bar code coupled with a human-readable Universal Product Code number. The Universal Product Code is a six-digit manufacturer identification number that provides information regarding a product, such as the manufacturer identification and product item number.

Radio Frequency identification (RFID) may also be used to identify, locate, and track items in an inventory. RFID is an automated identification method that is typically utilized in automating integrated supply chains within retail and distribution to identify and/or locate items currently in stock. RFID systems utilize RFID readers and RFID tags to identify objects associated with an RFID tag. AN RFID reader is a transmitter and receiver. The reader transmits an interrogate signal to one or more RFID tags within an interrogate zone of the reader and receives radio transmissions from the tags responding to the interrogate signal. As used herein, an interrogate zone is a zone or region in which an interrogate signal has sufficient strength to be received by an RFID tag within the interrogate zone and trigger the RFID tag to transmit a radio frequency signal in response to the interrogate signal. AN RFID tag reader may take an entire inventory of all items within an interrogate zone having an RFID tag associated with the item.

Storage unit systems utilizing RFID alone may identify and locate items having an RFID tag within an interrogate zone. However, current RFID systems cannot determine a real-time depletion of individual items in an inventory interrogate zone. Therefore, items in an inventory may be completely consumed before the next scheduled item replacement or replenishment because current restocking systems are unable to automatically monitor real-time depletion of consumable items and compensate for these variables.

The illustrative embodiments recognize the need for a system to track the real-time depletion of items in an independent storage unit system. The independent storage unit system may be equipped with sufficient data to identify the items that are contained in the independent storage unit system. The independent storage unit systems may come pre-loaded with the identification data or may be loaded after installation by either transportable media or periodic updates across an attached network.

Since the independent storage unit system may not have access to the net weight (hereafter non-depleted mass) of an item, the system uses the tare mass of the item to determine the depletion of the item using the item's minimum mass to estimate the tare mass. To predict product consumption given the wide variance of container types, these embodiments estimate and refine the tare mass of an item. As there are more occurrences of the item in the system, a weighted average of the tare mass of all the occurrences are stored as the record tare mass. Other methods of refining the tare mass may be used within the scope of the illustrative embodiments, including using a simple average and using the most recent minimum mass of the depleted item. The record tare mass becomes a more accurate predictor of product depletion.

An item occurrence is a single occurrence of a particular item type. A record item is the accumulated record of all of the item occurrences for a particular item type. For example, a gallon of Farm Brand Milk bought on June $26^{th}$ and placed in a storage unit system is a single item occurrence of the record item Farm Brand Milk—1 gallon. The independent storage unit system stores a record of all the occurrences of Farm Brand Milk—1 gallon in a database.

The initial presence of an item in the storage system is detected by the controller. The initial presence of an item in the storage system is the first time that item occurrence has been sensed in the storage system. The controller is an application for controlling entry/exit readers, mass sensor shelves, and a user interface, in which code or instructions implementing the processes of the illustrative embodiments may be located. The controller retrieves data, instructions, and/or code from memory, such as main memory or read only memory. The controller activates the entry/exit readers to transmit an interrogate signal to identify any RFID tags within an interrogate zone of entry/exit reader.

The controller ascertains the identification of the item occurrence using an identification system such as an RFID or a barcode system. The controller then collects the initial mass of the item occurrence from the mass sensor shelf. To obtain a tare mass for the item occurrence, the controller searches a database for a record of the item type. The database is located within the independent storage unit system network.

The record of the item type is a history of all of the occurrences of that specific item identity in the storage system. A record of the item includes the item identification, a total mass, tare mass, a product type, and the number of occurrences of the item in the storage system. The item identification includes any method or system of identifying the item, such as a barcode or an RFID tag. The total mass of an item is an average of the initial mass of all the occurrences of the item. Tare mass is an approximated number, refined over the number of occurrences of the item in the system. A product type is a classification of items by product. In the example above, the product type is milk. Product type is included to search for similar items. Therefore, Farm Brand Milk and City Brand Milk are the same product type. The number of occurrences is the number of times the item has occurred in the independent storage unit system.

A detailed example will better illustrate some of the features of the example embodiments. Consider the case of a jar of Brand X honey placed by the user on a mass sensor shelf. The controller identifies the item using, in this example, an RFID tag and determines the item's associated initial mass and footprint from the mass sensor shelf. The controller then searches for the Brand X honey in the database. In this case, the record item is not found. Therefore, the controller assigns a predefined percentage of the initial mass of the item as the item tare. In this example, the jar of honey weighs 10 ounces. The predefined percentage, of the initial mass is set as 10%, for this example; thus, the tare mass of the jar of Brand X honey is 1 ounce. In other words, the controller estimates the empty weight of the jar of honey to be 10% of the initial mass and therefore estimates the tare mass to be 1 ounce.

The jar of honey is removed from the storage unit. The controller begins an elapsed time counter when the item is removed from the system. If an elapsed time limit is not exceeded before the item is returned to the system, upon the item's return the controller determines a real-time depletion of the item. The algorithm used is as follows:

$$(C_m - T = dl)$$

Wherein,
$C_m$ is the current item mass,
T is the tare mass, and
dl is the depletion level.

In this example, the jar of honey is removed and replaced with a mass of 8 ounces. The controller calculates as follows: The current item mass equals 8 ounces, and the tare mass equals 1 ounce, thus, 7 ounces of honey remain in the jar. The depletion level of the item is 7 ounces.

The jar is again removed from the storage unit. Again, the time limit is not exceeded before the item is returned to the system, so the controller determines a real-time depletion of the item. The jar is returned to the storage unit with a mass of 2 ounces. The controller calculates that there is 1 ounce of honey left in the jar. The jar is again removed from the storage unit. This time the jar is not returned within the time limit. The controller recognizes the last current mass of the item, 2 ounces, as the item's minimum mass.

The controller saves a record of the occurrence of the Brand X honey in a database, using the item minimum mass to recalculate and refine the record tare mass. The record includes the item identification, the product type, the initial mass, a calculated refined tare, and the number of occurrences of the item. The controller calculates the refined tare mass using the algorithm:

$$(No*Tp + Im)/(No + 1).$$

Wherein,
No is the number of occurrences of the item,
Tp is the previous tare mass of the item, and
Im is the minimum mass of the item.

In this case, the record contains the following: 100333201, honey, Brand X, 10 ounces, 1.5 ounces, 1 occurrence. Those of ordinary skill in the art will appreciate that there may be other algorithms to use in refining the tare mass, such as a simple average or the last minimum mass, and remain within the scope of the illustrative embodiments.

When a new item occurrence of Brand X is identified with item identification 100333201, the controller searches the records in the database and finds the record for 100333201. The mass sensor shelf provides the initial mass and footprint of the new occurrence of the item. If the initial mass and the footprint of the new item are within a predetermined threshold, the controller determines that the new item is another occurrence of the item. The predetermined threshold may be a user defined parameter and may depend upon the type of consumable item. The user may define a threshold of several pounds when storing building supplies, a threshold of several ounces when storing grocery items, and a few grams when storing pharmaceuticals. If the controller determines that the new item exceeds a predetermined threshold, the controller may prompt the user for confirmation of the item identity using the user interface.

The controller uses the refined tare mass of 1.5 ounces to calculate the non-depleted mass of the new item. Thus, the controller tracks the depletion of the item. In this occurrence, the controller detects the last mass of the honey jar as 0.6 ounces. The controller stores 0.6 ounces as the item minimum. The controller calculates the refined tare mass as follows:

$$([2\ occurrences]*[tare\ of\ 1.5\ ounces] + [last\ mass\ of\ 0.6])/([2\ occurrences] + 1)) = 1.2\ ounces$$

The controller saves the refined tare mass in the database. Thus, the record for 100333201 is updated to contain the following: 100333201, honey, Brand X, 10 ounces, 0.6 ounces, 1.2 ounces, 2 occurrences.

Next, the user places a 12 ounce jar of Farm honey in the system. The controller identifies the item as 3003332, honey, Farm. The mass sensor shelf provides the data for the initial mass and the footprint of the item. The controller then searches the local database for a record of an occurrence 3003332 and does not find one. In one embodiment, the user is prompted to enter the net weight of the item. Many products include the net weight of the item on the product label. If the user, through the user interface provides the net weight, a tare mass is calculated using the following algorithm: (initial item mass−net weight). Thus, item depletion is tracked using the calculated tare.

If the net weight of the item is not available, the controller may respond by providing the user with any or all of the following three choices. First, the user may select that the controller consider the item as the first occurrence of a new item. The controller would then set the tare mass equal to the initial mass of the item multiplied by a predefined percentage.

Secondly, the user may inform the controller of the product type. The user may do this by saying or typing the word "honey" into the user interface. The controller then searches the local database for the product type honey. Upon finding the product type honey, the controller compares the initial mass of the item with the total mass of the similar item. If the comparison is within a pre-defined window, the controller may use the tare mass of the similar item. If the comparison is outside the pre-defined window, the controller may calculate the tare mass using the following algorithm:

$$(Ts/S_{tot})*Ii.$$

Wherein,
Ts is the tare of the similar item,
$S_{tot}$ is the total mass of the similar item, and
Ii is the initial mass of the item.

Lastly, the user may ask the controller to search for a similar item. The controller may then search the local database for a record for a similar item. The attributes the controller searches for may be product type of the item. The criteria to search for a similar item may be predefined by the system or user defined to be any desired attributes.

In this example, the controller looks for a similar item. The controller finds a record for honey. In one example embodiment, the controller prompts the user to confirm that the new item is similar to Brand X honey. However, the user may choose to configure the system to skip the confirmation step. Once the user has confirmed that the product is similar, the controller then calculates the refined tare mass of the new item using the following algorithm:

$$(T_s/S_{tot})*I_i.$$

Wherein, $T_s$ is the tare of the similar item, $S_{tot}$ is the total miss of the similar item, and $I_i$ is the initial mass of the item.

The controller then calculates the non-depleted mass of the new item as 11 ounces using the refined tare. The controller then continues to monitor the mass depletion of the item as it is removed and replaced in the system.

Figure 1:
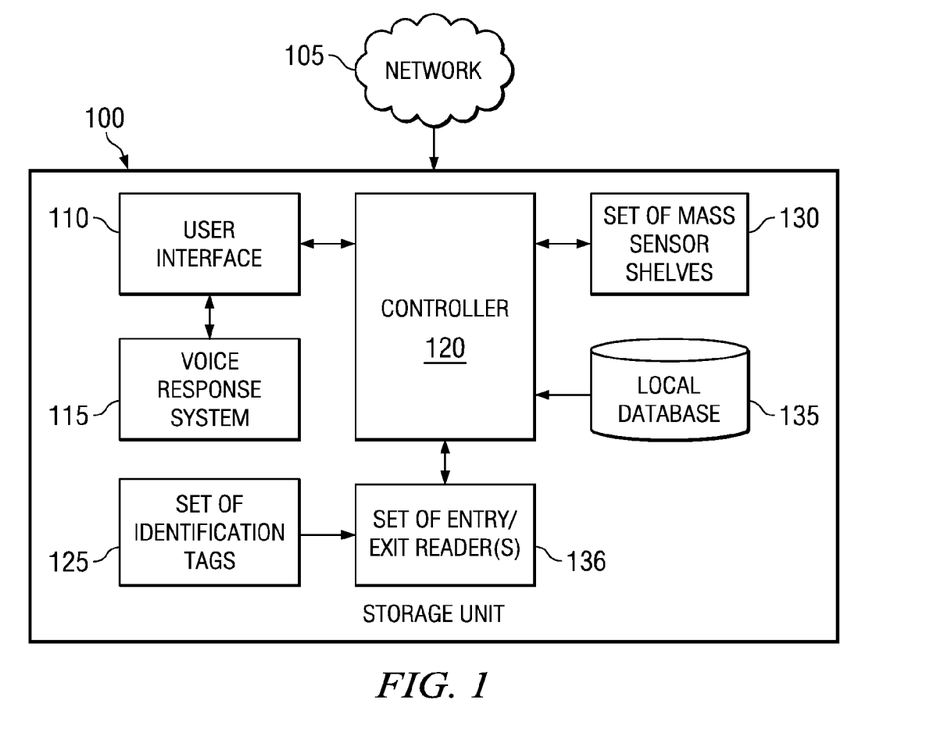
FIG. 1 is a pictorial representation of a system of storage units in which aspects of the present invention may be implemented in accordance with the illustrative embodiments.

FIG. 1 is a pictorial representation of a storage unit in accordance with the illustrative embodiments. Storage unit 100 is a storage unit for storing a plurality of consumable items.

User interface 110 provides a digital display for providing output to a user, as well as a keypad and/or touch screen for receiving input from a user. User interface 110 is associated with voice response system 115.

Voice response system 115 permits users to receive verbal output from controller 120. For example, when controller 120 determines that an initial mass of an identified item exceeds a recorded total mass for the item, voice response system 115 generates an auditory alert prompting a user to confirm the identification of the item.

Controller 120 is an application for receiving input and sending output to a user via user interface 110. Controller 120 identifies items associated with an identification tag placed in storage unit 100. Controller 120 also determines a real-time depletion of each identified item in storage unit 100 based on mass data for each identified item.

Item identification data includes an identification code from each identification tag in set of identification tags 125. Set of identification tags 125 is a set of one or more identification tags associated with one or more items in storage unit 100. Each identification tag in set of identification tags 125 has a unique item identification code associated with the identification tag. In this illustrative example, set of identification tags 125 is a set of RFID tags associated with a set of consumable items inside storage unit 100. Other forms of item identification, such as barcode readers are in accordance with the illustrative embodiments.

Set of mass sensor shelves 130 is a set of one or more customized shelves having a mass sensor grid on an upper surface of the shelf. Each mass sensor associated with a mass sensor shelf is an independent sensor capable of measuring a mass of an object resting on the mass sensor. Each mass sensor transmits mass sensor measurements in the form of mass sensor data to controller 120.

Controller 120 stores mass sensor data for each item in storage unit in local database 135. Mass sensor data for an identified item includes a current mass for an item, a prior mass for the item, an initial mass for the item and a last current mass for the item. A current mass is the most recent mass measurement for the item. The prior mass for the item is the previous mass for an item. The initial mass is the first mass measurement for the item when the item is identified by controller 120 for the first time. A last current mass for the item is the current mass for the last appearance of an item occurrence. In other words, the last current mass is the minimum mass measured for an item occurrence. The tare mass is the mass of the item when the product is totally depleted, in other words the empty packaging. The tare mass may be approximated from the last current mass of the item.

Controller 120 stores a record of all the occurrences of the item in local database 135. Some of the data stored in an item record is the item identification, a product type, a total mass, the number of occurrences and a tare mass. The item identification is the same as the item barcode or other means of identification for an item occurrence. The total mass is a recorded value of the average initial mass for all of the occurrences of the item. The number of occurrences is the number of times that item identification has occurred in the storage system. The tare mass is approximated from the minimum mass of all of the occurrences of the item. The minimum mass of an occurrence of an item is equal to the last current mass of the item occurrence.

The non-depleted mass, typically called the net weight of the item may be approximated based on a tare mass and the initial mass of the item. The non-depleted mass is the original product mass of an item prior to use by a consumer. However, the non-depleted mass may not be available. The tare mass of the item may also be unknown but approximated by the last current mass of an item occurrence and refined over time by further occurrences of the item in the illustrative embodiments of the invention. Therefore, the non-depleted mass of the item is approximated by subtracting the tare mass of the item from the initial mass of the item.

Controller 120 stores item identification data for each item in the storage unit in database 135. Item identification data includes an identification code from each identification tag in set of identification tags 125. Each identification code is associated with an item description. The item description describes the item. For example, an item description for cereal could be "Apple Jacks®," or "Frosted Flakes®." The identification code is also associated with a product type. Both "Apple Jacks®" and "Frosted Flakes®," may be classified product type "cold cereal."

Set of entry/exit reader(s) 136 is a set of one or more entry/exit reader(s). Entry/exit readers are activated by controller 120 each time a door on storage unit 100 is opened.

In this illustrative example, controller 120 activates set of entry/exit readers 136 when controller 120 detects a door of storage unit 100 is opened. An entry/exit reader transmits an interrogate signal. The entry/exit reader identifies an item based on a response signal received from an identification tag associated with the item as the item enters storage unit 100.

A set of mass sensors associated with a given mass sensor shelf in set of mass sensor shelves 130 registers mass measurements for the identified item when the identified item is placed on the given mass sensor shelf. The set of mass sensors transmits the mass data to controller 120.

Controller 120 retrieves the total mass for the recorded item. Controller 120 then compares the initial mass of the item with the total mass of the recorded item to provide a validation of the item. An acceptable match is a predetermined amount between the initial mass of the item and the total mass of the recorded item. If the item and the recorded item are an acceptable match, then the recorded tare mass may be used for the tare mass of the item. Further, when the last current mass is detected for the item, the number will be used in a weighted average to further refine the recorded tare.

Next, controller 120 determines a real-time depletion level for the identified item by the following algorithm: Depletion equals Current item Mass minus tare. If the current item mass exceeds the total item mass, controller 120 generates an alert via user interface 110. Controller 120 prompts a user to confirm the identification of the item and/or confirm the location of the item via the user interface.

Controller 120 monitors real-time depletion of each identified item in storage unit 100 by comparing refined current mass measurements for each item with a non-depleted mass for the item. When the refined current mass of an identified item reaches a threshold depletion the item is identified as a depleted item. The threshold depletion may be the recorded tare mass plus a user-selectable number or a user-selectable percentage of the tare. Controller 120 provides a notification to a user to replace and/or replenish depleted items via user interface 110.

Storage unit 100 functions independently of outside network 105 in accordance with the illustrative embodiments. However, the controller may communicate with other data processing systems to update preloaded system data on a periodic basis, via network 105. Between updates, the controller may function independently from a non-local network. The periodic updates may include new or changed product information as well as functional system updates and enhancements.

Storage unit 100 may be connected to network 105. Network 105 is a medium used to provide communications links between various devices and storage units connected together. Network 105 may include connections, such as wire, wireless communication links, or fiber optic cables.

Figure 2:
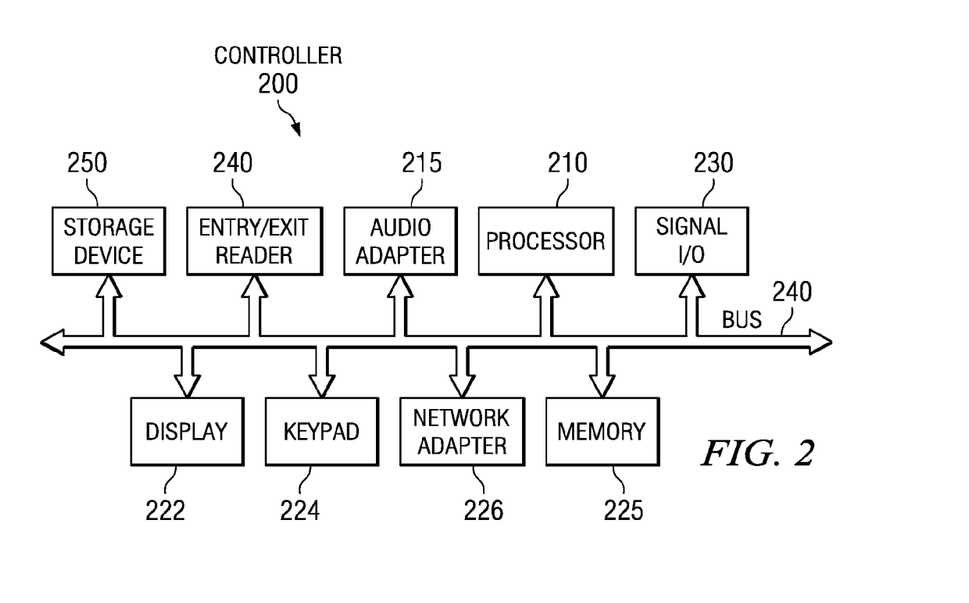
FIG. 2 is a block diagram of a controller in which aspects of the present invention may be implemented in accordance with the illustrative embodiments.

FIG. 2 is a block diagram of a controller in accordance with an illustrative embodiment. A controller is an application that analyzes the mass data from the set of mass sensors to determine the current mass of the object.

Controller 200 is one example of a controller, such as the controller described in FIG. 1 for controlling entry/exit readers, mass sensor shelves, and a user interface, in which code or instructions implementing the processes of the illustrative embodiments may be located.

Processor 210, audio adapter 215, memory 225, display 222, keypad 224, network adapter 226, and signal input/output (I/O) 230 are connected via bus 240. Bus 240 may be comprised of one or more buses, such as a system bus and/or an I/O bus. Bus 240 may be implemented using any type of communications fabric or architecture that provides for a transfer of data between different components or devices attached to the fabric or architecture.

Processor 210 may include one or more processors or CPUs. Memory 225 may be a main memory, a read only memory (ROM), a random access memory (RAM), flash memory, a cache, or any other known or available memory for storing data, instructions, and/or computer program code. Controller 200 retrieves data, instructions, and/or code from memory, such as main memory or read only memory. In addition, controller 200 may retrieve data, instructions, and/or code from a remote memory location via a network connection.

Display 222 may include a touch screen display, an LED display, or any other type of known or available display for presenting output to a user or receiving input from a user. Keypad 224 is any type of known or available alphanumeric keypad for a user to provide input in the form of data, instructions, or program code to controller 200.

Aspects of these illustrative embodiments may function independently from an outside network. However, the controller may communicate with other data processing systems to update preloaded system data on a periodic basis. Between updates, the controller may function independently from a non-local network. The periodic updates may include new or changed product information as well as functional system updates and enhancements. Network adapter 226 is coupled to the system to enable the data processing system to become coupled to other data processing systems or remote printers or storage devices through intervening private or public networks. Modems, cable modems, and Ethernet cards are just a few of the currently available types of network adapters.

In the illustrative embodiments, controller 200 is not connected to network adapter 226, but is an independent system. In an independent system embodiment, the controller may only have access to local databases. In other words, the local databases are within the independent storage unit system network wherever the databases are physically located.

Signal input/output 230 includes one or more devices for sending and receiving signals to and from different components in a storage unit, such as a digital display and keypad, a touch screen, a voice recognition interface, an LED display, and/or any other known or available device for sending and receiving input and output. Tag reader 240 is an entry/exit reader such as set of entry/exit readers 136 in FIG. 1.

Controller 200 is coupled to entry/exit reader 240 via bus 240. Controller 200 activates entry/exit reader 240 to transmit an interrogate signal to identify any RFID tags within an interrogate zone of entry/exit reader 240.

Storage device 250 is also optionally connected to bus 240. Storage device 250 may include any type of permanent and removable storage media. In addition, storage device 250 may include a remote storage device or storage provided by a storage service. Program code and instructions are located on storage device 250 and may be loaded into memory 225 for execution by processor 210.

The processes of the illustrative embodiments are performed by processor 210 using computer implemented instructions, which may be located in memory 225. Processor 210, memory 225, signal input/output 230, and storage device 250 are functional components that may be implemented as functions in an application specific integrated circuit rather than using a processor paradigm.

Figure 3:
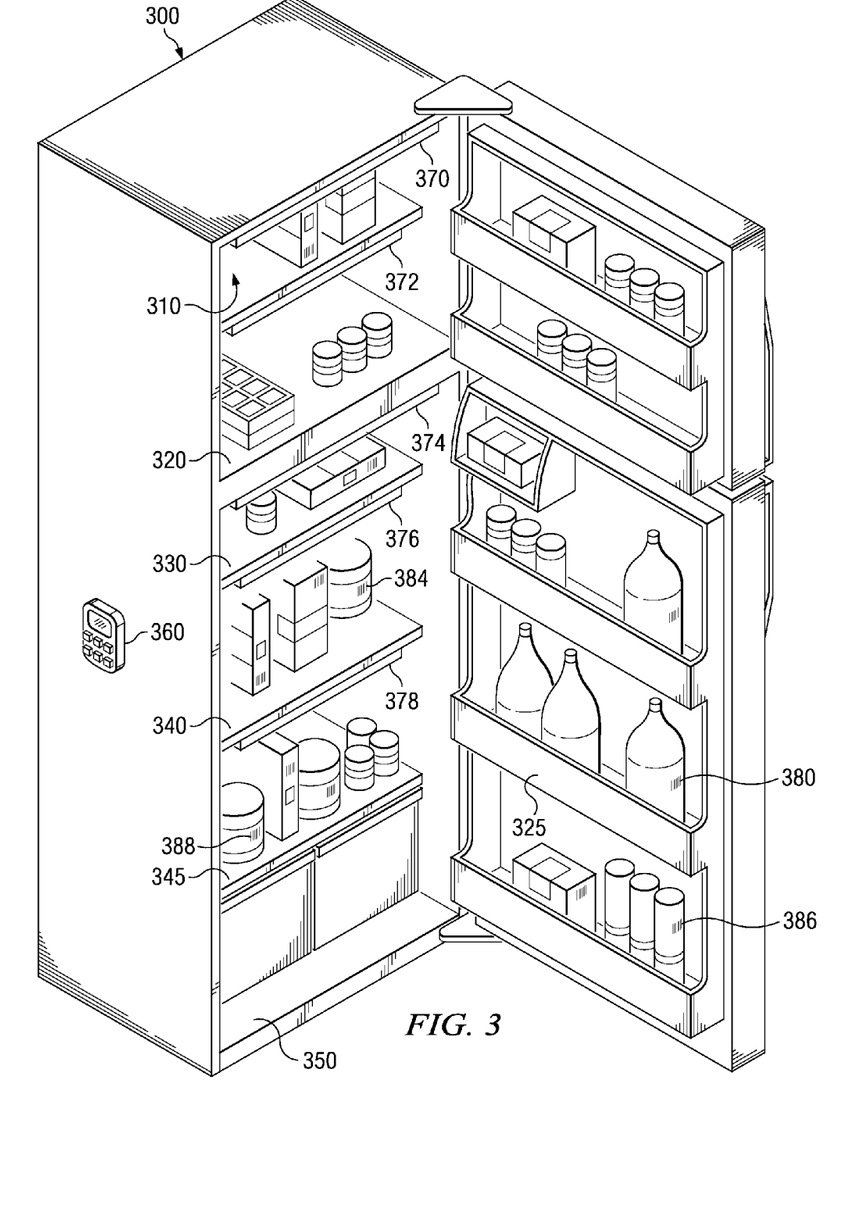
FIG. 3 is a pictorial representation of a refrigeration unit including a set of mass sensor shelves and entry/exit readers in which aspects of the present invention may be implemented in accordance with the illustrative embodiments.

FIG. 3 is a pictorial representation of a refrigeration unit including a set of mass sensor shelves and entry/exit readers in which aspects of the present invention may be implemented in accordance with the illustrative embodiments. As used herein, a refrigeration unit is any device, appliance, cabinet, or room for storing food or any other substance at a lower temperature than room temperature. For example, a refrigeration unit includes a refrigerator, a freezer, a combination refrigerator and freezer, an ice box, a refrigerated railcar, a meat locker, an industrial refrigerator, an industrial freezer, a chest freezer, a reach-in cabinet, a meat case, a frozen food cabinet, a beverage cooler, a food service cart, an ice cream cabinet, a soda fountain unit, and any other known or available device or appliance for storing items at a temperature lower than room temperature. However, the illustrative embodiments encompass any type of storage system whether at room temperature, below room temperature, or above room temperature.

Refrigerator 300 is a storage unit. Refrigerator 300 is any known or available refrigerator. In this illustrative example, refrigerator 300 is depicted as a consumer size refrigerator/freezer. However, the aspects of the illustrative embodiments are equally applicable to a refrigerator or freezer of any size, including, but not limited to, an apartment sized refrigerator/freezer, a room sized industrial refrigerator and/or a room-sized industrial freezer.

Refrigerator 300 includes a set of mass sensor shelves. As used here, a set of mass sensor shelves includes a single mass sensor shelf, as well as two or more mass sensor shelves. The set of mass sensor shelves includes mass sensor shelves 320-350. Each mass sensor shelf is a shelf consisting of a grid of mass sensors. Each mass sensor in the grid is capable of detecting a whole or partial mass of an object. The mass of an object is detected when an object is completely or partially resting on any portion of the mass sensor.

In accordance with the aspects of the illustrative embodiments, a mass sensor shelf may be a typical shelf in a main compartment of a refrigeration unit, a shelf in a door, a bottom of a compartment of a refrigerator or freezer, a bottom of a door compartment, or any other surface within a refrigeration unit capable of including mass sensors in a mass sensor grid. For example, in this illustrative embodiment, mass sensor shelf 320 is a mass sensor shelf located in a freezer compartment of refrigerator 300. Mass sensor shelf 325 is a shelf in a door of the refrigerator. Mass sensor shelf 330, mass sensor shelf 340, and mass sensor shelf 345 are shelves located in a refrigerator compartment of refrigerator 300. Mass sensor shelf 350 is a mass sensor shelf located in the bottom of a drawer of refrigerator 300.

Refrigerator 300 includes a set of entry/exit readers, such as entry/exit readers 370-378. Entry/exit readers 370-378 are RFID readers. Refrigerator 300 also includes a controller for controlling entry/exit readers 370-378 and receiving mass data from the set of mass sensor shelves associated with refrigerator 300. The controller receives data from a user and provides data to a user via a user interface.

In this example, the user interface 360 is located on an outside panel of a door or outer side wall of refrigerator 300. In this example, the user interface is a digital display and keypad that provides output to a user and accepts input from the user. The digital display is any type of display for providing information to a user in the form of characters, numbers, symbols, or letters. The display may also include a touch screen for accepting input from a user. The keypad is an input device for data entry by a user. The keypad comprises alphanumeric keys and functional keys. In another example, the user interface may include voice recognition software and a voice synthesizer for accepting verbal input from a user and providing verbal output to a user.

Refrigerator 300 also includes a variety of items stored within refrigerator 300. A number of the items have an identification tag associated with the item, such as identification tags 380-388. In accordance with this example, identification tags 380-388 are RFID tags.

Entry/exit readers 370-378 are each located in a position parallel to a mass sensor shelf below the given entry/exit reader. For example, entry/exit reader 370 is located above a mass sensor shelf such that entry/exit reader 370 is parallel or horizontal to the mass sensor shelf below it. However, entry/exit readers 370-378 may be placed at any location within refrigerator 300 in order to receive and transmit radio frequencies to RFID tags associated with items inside refrigerator 300. For example, entry/exit reader 378 could be positioned on a side wall of the upper shelf inside the refrigerator compartment or a back wall of the refrigerator compartment.

In this illustrative embodiment, five entry/exit readers are depicted. However, in accordance with the aspects of the illustrative embodiment, any number of entry/exit readers may be located within refrigerator 300. For example, an entry/exit reader may be positioned in a location parallel to every shelf in refrigerator 300. In this example, six entry/exit readers are located within refrigerator 300. In this illustrative example, a single entry/exit reader is capable of receiving and transmitting radio frequencies to RFID tags located anywhere within the freezer compartment of refrigerator 300.

A user is not required to manually scan identification tags at entry/exit readers 370-378 because an RFID reader is capable of automatically sending and receiving radio frequencies from an RFID tag without user intervention. In this example, entry/exit readers 370-378 are automatically activated to scan for items being placed inside refrigerator 300 and items being removed from refrigerator 300 when the refrigerator door is opened.

In accordance with an alternative embodiment, identification tags 380-388 are Universal Product Code bar codes and entry/exit readers 370-378 are Universal Product Code scanners. A user must manually scan identification tag 380 at an entry/exit reader, such as entry/exit reader 378. Identification tag 380 should be scanned by the user when the item associated with identification tag 380 is placed in refrigerator 300 or removed from refrigerator 300.

In this example, any number of entry/exit readers may be included in refrigerator 300. However, only a single Universal Product Code scanner entry/exit reader is required for a user to scan items before placement in refrigerator 300 and/or removal of items from refrigerator 300.

Figure 4:
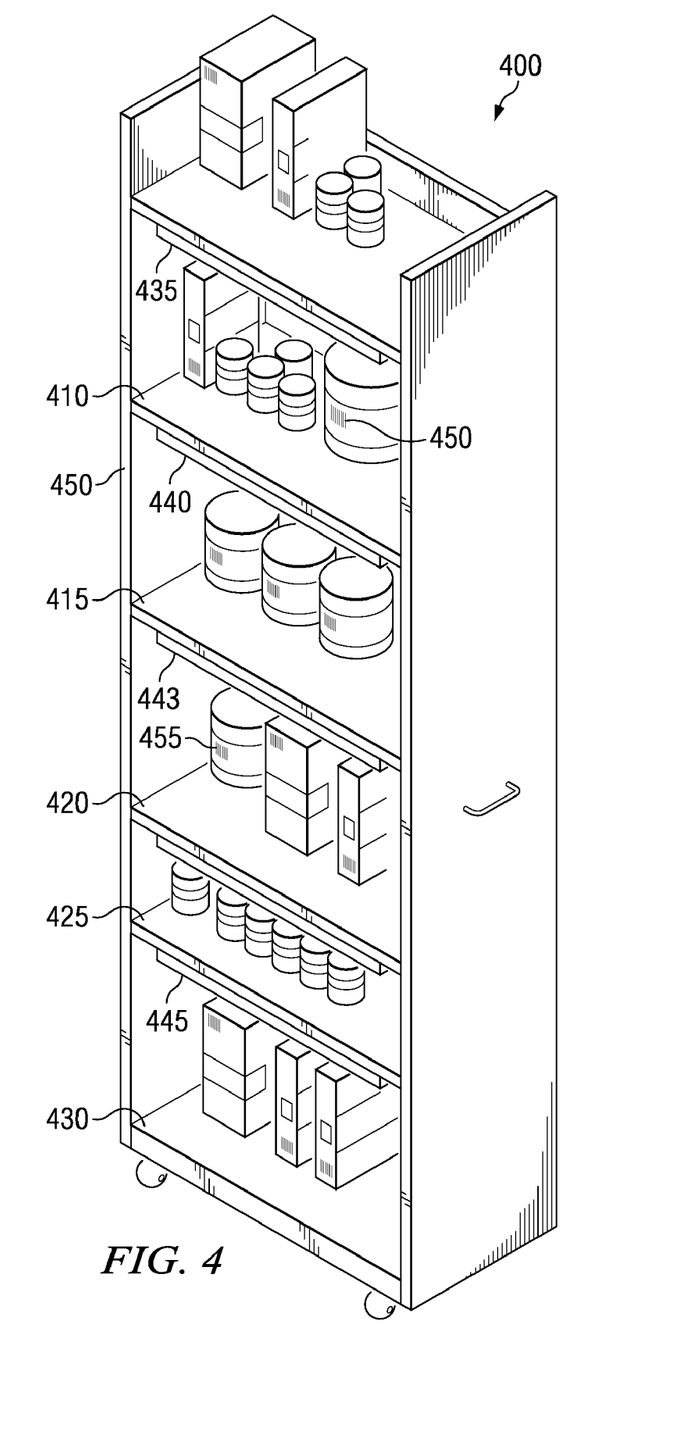
FIG. 4 is a pictorial representation of a set of shelves including mass sensor shelves and entry/exit readers in which aspects of the present invention may be implemented in accordance with the illustrative embodiments.

FIG. 4 is a pictorial representation of a set of shelves including mass sensor shelves and entry/exit readers in which aspects of the present invention may be implemented in accordance with an illustrative embodiment. Set of shelves 400 is a storage unit.

Set of shelves 400 includes a set of mass sensor shelves. The set of mass sensor shelves includes mass sensor shelves 410, 415, 420, 425, and 430. In this example, set of shelves 400 includes five mass sensor shelves. However, in accordance with the aspects of the illustrative embodiments, set of shelves 400 may include any number of mass sensor shelves.

Set of shelves 400 also includes a set of entry/exit readers. The set of entry/exit readers includes entry/exit readers 435, 440, 443, and 445. Set of shelves 400 contains consumable items. Some of the consumable items have identification tags associated with the items, such as identification tags 450-455. In this example, identification tags 450-455 are RFID tags.

In this illustrative example, entry/exit readers 435-445 are RFID readers. Entry/exit readers 435-445 are activated by the controller to transmit an interrogate signal. The interrogate signal is received by a set of identification tags when a change in mass sensor data from a set of mass sensors associated with a mass sensor shelf is detected. As used herein, a set of identification tags includes a single identification tag, as well as two or more identification tags.

In another example, entry/exit readers 435-445 are activated by a motion detection apparatus incorporated within entry/exit readers 435-445. The motion detection apparatus detects motion when a user places an item in set of shelves 400 and/or removes an item from set of shelves 400. Upon detecting motion, the motion detection apparatus activates an entry/exit reader associated with the motion detection apparatus.

In this example, each entry/exit reader is located along a side wall of set of shelves 400. However, in accordance with another embodiment, an entry/exit reader may be located anywhere in association with set of shelves 400. For example, entry/exit reader 435 may be positioned in a location above and parallel to a mass sensor shelf below the entry/exit reader, such as mass sensor shelf 410. Set of shelves 400 may also include a user interface as user interface 360 in FIG. 3.

Although the illustrative example does not depict a mass sensor shelf and entry/exit reader associated with the uppermost shelf of set of shelves, in another example, the uppermost shelf is also a mass sensor shelf having an entry/exit reader associated with the uppermost shelf.

In this illustrative example, set of shelves 400 is a set of shelves in a location at room temperature. In another illustrative example, set of shelves 400 is a set of shelves inside an industrial sized walk-in refrigeration unit. In such a case, the consumable items stored on set of shelves 400 may be items stored at a temperature lower than room temperature.

In accordance with an alternative example, entry/exit readers 435-445 are Universal Product Code scanners and identification tags 450-455 are Universal Product Code bar codes. In this example, a user must manually scan identification tags 450-455 at one of entry/exit readers 435-445 when an item associated with identification tags 450-455 are placed inside set of shelves 400 and/or removed from set of shelves 400.

Figure 5A:
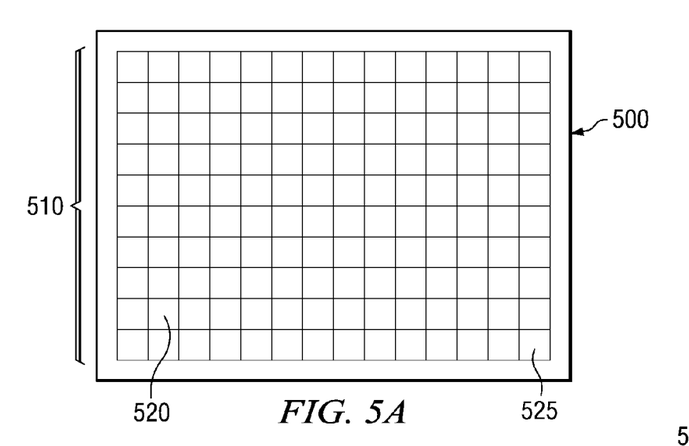
FIG. 5A is a block diagram of a mass sensor shelf having a mass sensor grid in accordance with the illustrative embodiments.

FIG. 5A is a block diagram of a mass sensor shelf having a mass sensor grid in accordance with an illustrative embodiment. Mass sensor shelf 500 is a mass sensor shelf inside a storage unit, such as refrigerator 300 in FIG. 3. Mass sensor shelf 500 has a mass sensor grid 510 spanning the entire area of an upper surface of mass sensor shelf 500. Mass sensor grid 510 includes a plurality of mass sensors, such as mass sensor 520 and mass sensor 525.

Each block in mass sensor grid 510 represents an individual mass sensor in the plurality of mass sensors. Each sensor is separate and isolated from every other sensor in the mass sensor grid. In this illustrative example, mass sensors 520-525, are tiny mass sensors measuring one centimeter by one centimeter. In accordance with the aspects of the illustrative embodiments, mass sensors may be any shape and any size mass sensors. For example, mass sensors 520-525 may measure one centimeter by two centimeters, or any other size.

Mass sensors 520-525 in mass sensor grid 510 may measure a mass of an item wholly or partially placed on top of a given mass sensor. Thus, when an object is placed on a mass sensor shelf, each mass sensor covered by the object will generate mass data regarding a portion of the object. The process of the present invention utilizes mass data from the set of mass sensors covered by an object on a mass sensor shelf to determine a mass of the object.

Figure 5B:
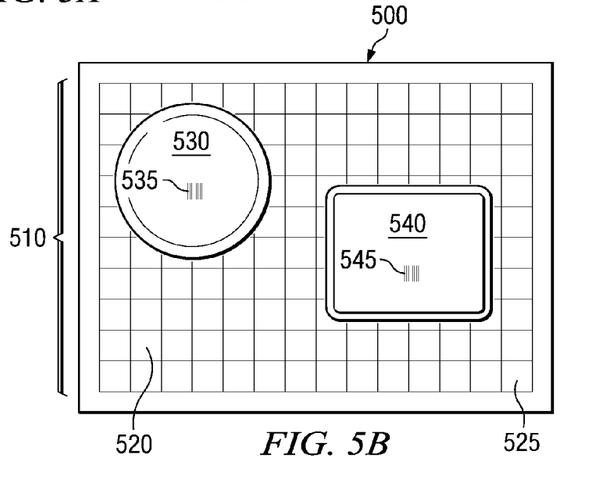
FIG. 5B is a block diagram of a mass sensor shelf having a mass sensor grid and consumable items on the shelf in accordance with the illustrative embodiments.

FIG. 5B is a block diagram of a mass sensor shelf having a mass sensor grid and consumable items on the shelf in accordance with an illustrative embodiment. Jar of peanut butter Unit 530 is located on mass sensor shelf 500. Unit 530 rests on a set of mass sensors of mass sensor grid 510. The set of mass sensors generates mass data regarding the mass of Unit 530.

Unit 530 is associated with identifier tag 535. Identifier tag 535 is read by an entry/exit reader to identify unit 530 as a jar of peanut butter. Unit 540 is associated with identifier tag 545.

A set of mass sensors covered by Unit 540 generate mass data regarding the mass of Unit 540. This information is transmitted to a controller. The controller is an application that may determine a depletion of a particular item based on the data from an identification tag and mass data from the set of mass sensors.

Thus, when an object is placed on a mass sensor shelf, the object will rest on a set of mass sensors on the portion of the shelf covered by the object. Each mass sensor in the set of mass sensors transmits mass data regarding the mass of the object to a controller.

Figure 6:
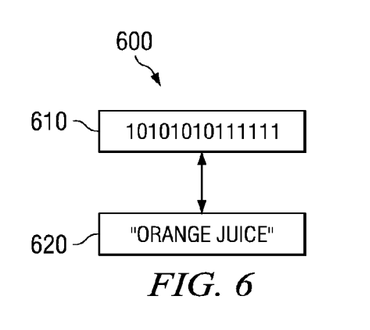
FIG. 6 is a block diagram illustrating an association of an identification code from an identifier tag with a consumable item description in accordance with the illustrative embodiments.

FIG. 6 is a block diagram illustrating an association of an identification code from an identifier tag with a consumable item description in accordance with an illustrative embodiment. Data structure 600 is an example of data stored as a description pair in a database, such as local database 235 in FIG. 2. The description pair includes a machine readable identification code, such as "10101010111111" associated with identification tag 610. The pair also includes a human readable item description 620 that is associated with identification code "10101010111111" associated with identification tag 610. Other examples of identification codes include, for example, "1234564," "A," or any other code that is unique among all identification codes that a tag reader may read.

In this illustrative example, identification tag 610 having code "10101010111111" is associated with item description "orange juice" 620. An item description is a human understandable description of an item. Human understandable descriptions are for example, text, audio, graphic, or other representations suited for display or audible output.

A user interface and tag reader operates cooperatively with identification tags to identify items for placement in a storage unit and/or identify items already placed inside a storage unit. Identification tags, such as identification tag 610 may be any type of identification tag, including Universal Product Code (UPC) bar code identification tags and RFID (RFID) tags. RFID tags include read-only identification tags and read-write identification tags.

Figure 7:
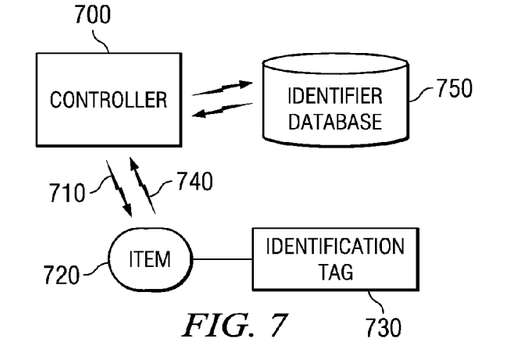
FIG. 7 is a block diagram illustrating an interaction of a user interface and tag reader with an identification tag in accordance with the illustrative embodiments.

FIG. 7 is a block diagram illustrating an interaction of a user interface and tag reader with an identification tag in accordance with an illustrative embodiment. Controller 700 is a controller such as controller 120 in FIG. 1 and controller 200 in FIG. 2. Controller 700 includes a user interface and entry/exit reader(s). Controller 700 activates an entry/exit reader associated with a storage unit to generate an interrogate signal 710 to form an interrogation zone. Item 720 is located within the interrogation zone of the entry/exit reader. Identification tag 730 associated with item 720 receives interrogate signal 710. In response to receiving interrogate signal 710, identification tag 730 generates response signal 740 via an antenna on the identification tag.

Controller 700 receives response signal 740. Controller 700 analyzes response signal 740 to identify an identification code for item 720. Controller 700 identifies item 720 by identifying an item description, such as item description 620 in FIG. 6, in identifier database 750 associated with the identifier code for identification tag 730.

Figure 8:
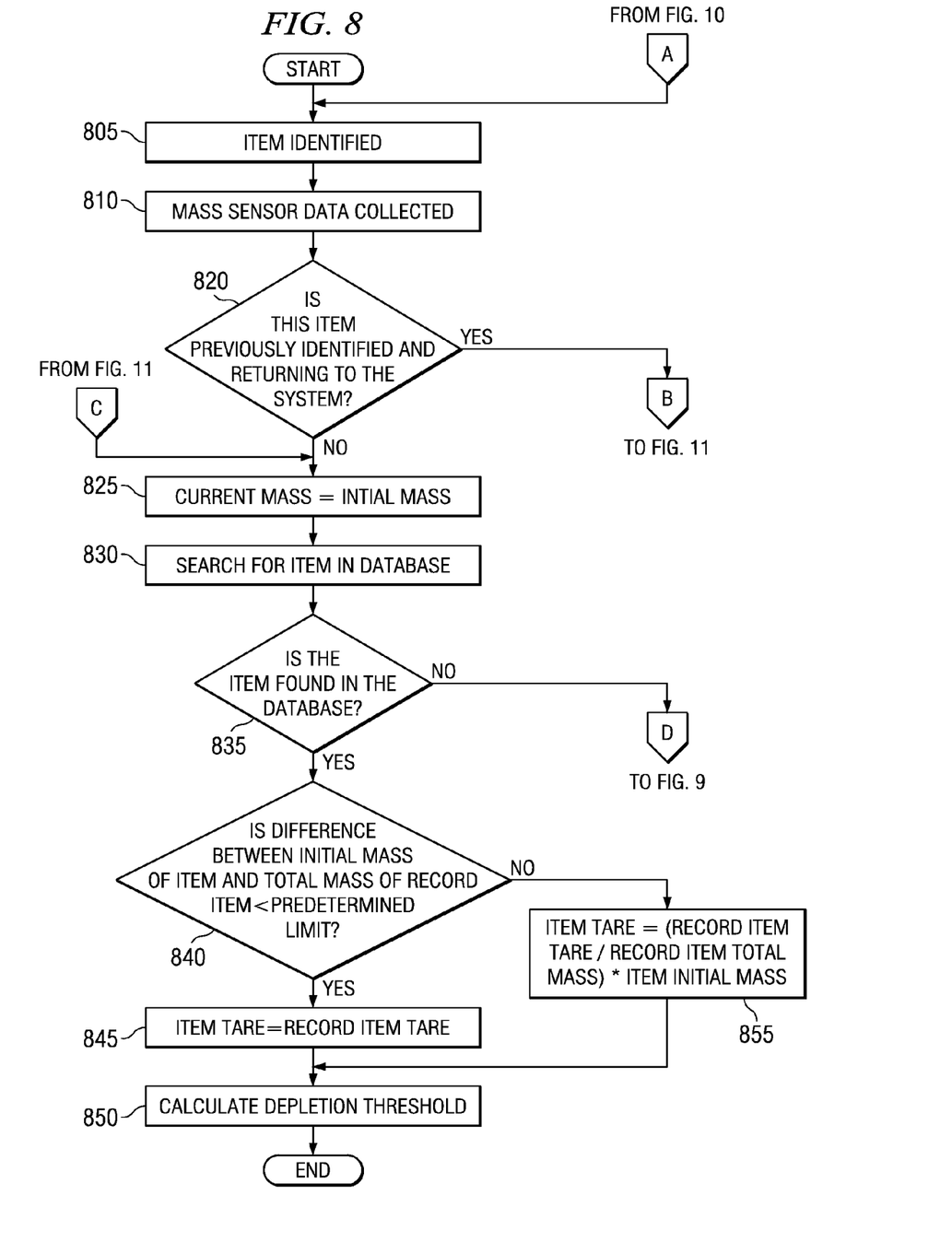
FIG. 8 is a flowchart illustrating a process for finding item tare mass if item identity is found within a storage system database in accordance with the illustrative embodiments.

FIG. 8 is a flowchart illustrating a process for finding item tare mass if the item identity is found within a storage system database in accordance with the illustrative embodiments. The process is implemented by controller 200 in FIG. 2.

The controller receives an item identifier identifying an item being placed inside a storage unit (step 805). When a change in mass sensor data is sensed, the controller utilizes the mass sensor data to detect a mass and a footprint for the identified item (step 810). The controller then determines whether the item is a previously identified item that is returning to the storage unit (step 820). If the item is a returning item, the process continues in FIG. 9.

If the item is not a returning, previously identified item, the initial mass of the item is set equal to the current mass of the item (step 825). The controller searches for the item identity in the system database (step 830). If the item identity is not found in the database, the process continues in FIG. 10. If the item identity is found in the database (step 835), the controller determines if the difference between initial mass of the item and the total mass of the record item is less than a predetermined limit (step 840). If the item identity is not found in the database then the process falls to step 905 in FIG. 9. If the difference between the initial mass of the item and the total mass of the record item is less than a predetermined amount then the controller sets the tare mass of the item equal to the recorded tare mass found in the database (step 845). The controller then calculates the depletion threshold using the tare mass (step 850), thereby ending the process. If the difference between the initial mass of the item and the total mass of the record item is greater than a predetermined amount, then the controller sets $T=(Tr/R_{tot})*Ii$ (step 855). Wherein T is the tare mass of the item, Tr is the Record item tare, and $R_{tot}$ is the Record item total mass, and Ii is the initial mass of the item. The controller calculates the depletion threshold using the tare mass (step 850), thereby ending the process.

Figure 9:
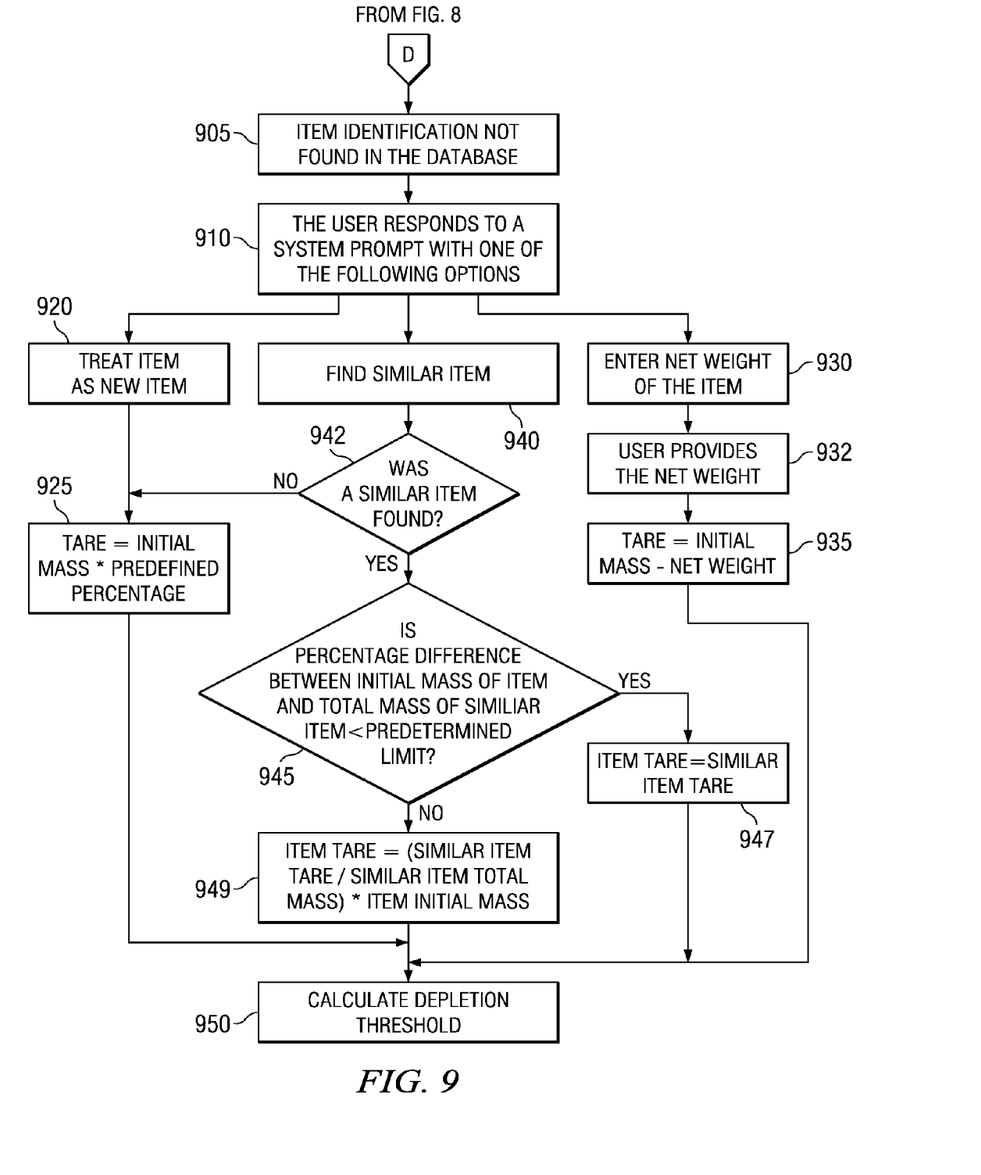
FIG. 9 is a flowchart illustrating a process for finding item tare mass if the item identity is not found within a storage system database in accordance with the illustrative embodiments.

FIG. 9 is a flowchart illustrating a process for finding item tare mass if the item identity is not found within a storage system database in accordance with the illustrative embodiments. If the controller does not find the item identity in the database (step 905), the controller prompts the user through the user interface with three options (step 910). The first option is to request the controller treat the item as a new item (step 920). If the user selects the new item option, the controller then calculates tare mass as the initial mass of the item multiplied by a predefined percentage (step 925).

If the user selects the "enter the net weight of the item" option (step 930), and then provides the net weight (step 932), the controller calculates tare mass from the initial mass and the net weight as follows: tare mass is equal to initial mass minus net weight (step 935).

Lastly, if the user selects the "find similar item" option, the controller searches the database for an item record of the same product type (step 942). If a similar item is found (step 942), the controller finds the percentage difference between the initial mass of the item and the total mass of the similar item (step 945). If the percentage difference is less than a predetermined limit then tare mass is set equal to the similar item tare mass (step 947). If the percent difference is greater than a predetermined limit then $T=(Ts/S_{tot})*Ii$ (step 949). Wherein, T is the tare mass, Ts is the similar item tare, $S_{tot}$ is the similar item total mass and Ii is the item initial mass. The controller calculates the depletion threshold following a determination of tare mass (step 950).

Figure 10:
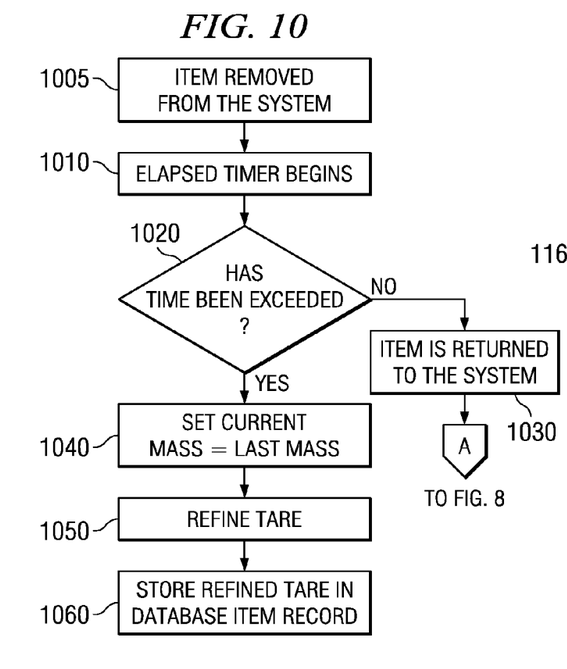
FIG. 10 is a flowchart illustrating a process for refining the item tare mass in accordance with the illustrative embodiments.

FIG. 10 is a flowchart illustrating a process for refining the item tare, in accordance with the illustrative embodiments. The process begins when an item is removed from the storage system (step 1005). An elapsed timer begins tracking the time the item is absent from the system (step 1010). The controller determines if the elapsed time limit has been exceeded (1020). If the item is returned to the system before the elapsed time limit (step 1030), the timer stops and does not begin again until the item is removed from the system (step 1005). If the item is not returned to the storage system before the time is exceeded, the controller sets the last mass of the item equal to the current mass of the item (step 1040). The tare mass for the recorded item is then refined by taking the weighted average of all the item occurrence tares and the last mass of the item as follows: (step 1050). $T_{ref}=(No*Tr+Il)/No+1$. Wherein $T_{ref}$ is the refined tare mass, No is the number of item occurrences, Tr is the recorded tare, and Il is the last mass of the item. The refined tare mass is then stored in the database item record (step 1060).

Figure 11:
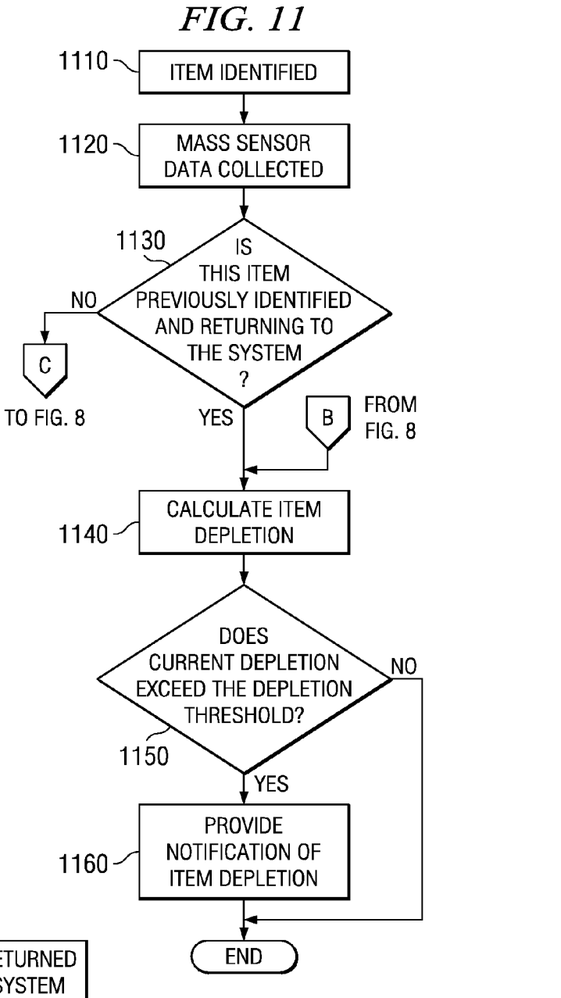
FIG. 11 is a flowchart illustrating a process for alerting the user to a depleted item in accordance with the illustrative embodiments.

FIG. 11 is a flowchart illustrating a process for alerting the user to a depleted item, in accordance with the illustrative embodiments. The process begins when an item is identified (step 1110). Mass sensor data is collected (step 1120). The data includes the current mass of the item and the footprint of the item. The controller then determines if the item is previously identified and returning to the system (step 1130). If the item is a new item, the process falls to step 825 in FIG. 8. If the item is a returning item, the item depletion is calculated (step 1140). The controller then determines if the current depletion exceeds the depletion threshold (step 1150). If the current depletion does exceed the depletion threshold, the controller provides notification of the item depletion to the user (step 1160), with the process terminating thereafter. If the current depletion does not exceed the depletion threshold, the process terminates thereafter.

Determining depletion of consumable items based on historical trends fails to compensate for external forces influencing the rate of depletion of consumable items. Moreover, consumption rates of some items are so sporadic or erratic that it is impossible or impractical to track depletion rates based on past usage. The failure to closely approximate usage of consumable items may lead to overstocking of some items that are replaced earlier than necessary, as well as understocking of other items that are not replaced when needed. Therefore, the aspects of the illustrative embodiments provide a computer implemented method, apparatus, and computer program code for monitoring a real-time depletion of an item in an independent storage system. A controller identifies an item placed in the storage unit in the storage system to form an identified item. The controller detects a change in a mass sensor data from a mass sensor shelf in a set of mass sensor shelves associated with the storage unit. The controller associates the mass sensor data with the identified item to form a current mass for the identified item. The controller determines a depletion of the identified item based on a difference between the current mass and a previous mass for the identified item.

Monitoring real-time depletion of items in a storage unit overcomes the problems associated with accurate and timely restocking of consumable items associated with a storage unit, such as a refrigerator or storage cabinet.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring a storage unit, the method comprising:
    responsive to a computer detecting an initial presence of an item in the storage unit, collecting, by the computer, an item identification of the item, a product type of the item, and an initial mass of the item; and
    searching, by the computer, a database for a recorded item containing the item identification;
    retrieving, by the computer, a total mass of the recorded item from the database;
    comparing, by the computer, the initial mass of the item with the total mass of the recorded item; and
    responsive to a difference between the initial mass of the item and the total mass of the recorded item that is less than a predetermined amount, setting, by the computer, a tare mass of the item equal to a tare mass of the recorded item retrieved from the database;
    responsive to the computer detecting the item has been removed and replaced in the storage unit, collecting, by the computer, a current mass of the item; and
    determining, by the computer, a mass depletion of the item as the current mass of the item minus the tare mass of the item; and
    responsive to the mass depletion of the item reaching a threshold depletion, the computer alerting a user.

2. The method of claim 1, further comprising:
    responsive to the difference between the initial mass of the item and the total mass of the recorded item that is greater than a predetermined amount, the computer prompting the user to confirm the identity of the item; and
    responsive to a positive confirmation of the item, calculating, by the computer, the tare mass of the item as $(Tr/R_{tot})*Ii$, wherein Tr is the tare mass of the recorded item, $R_{tot}$ is the total mass of the recorded item and Ii is the initial mass of the item.

3. The method of claim 1, further comprising:
    responsive to an absence of the recorded item in the database, the computer prompting the user to provide a net weight of the item, an instruction to search for a similar item, or an instruction to estimate the tare mass of the item.

4. The method of claim 3, wherein responsive to the user providing the net weight of the item, the tare mass of the item is set, by the computer, equal to the initial mass of the item minus the net weight of the item.

5. The method of claim 3, wherein based on the computer finding the similar item, the tare mass of the item is set, by the computer, equal to a tare mass of the similar item, provided that the difference between the initial mass of the item and a total mass of the similar item is less than a predetermined amount.

6. The method of claim 5, wherein provided the difference between the initial mass of the item and the total mass of the similar item is greater than a predetermined amount, calculating, by the computer, a new tare mass of the item as $((Ts/S_{tot})*Ii)$, wherein Ts is the tare mass of the similar item, $S_{tot}$ is the total mass of the similar item, and Ii is the initial mass of the item.

7. The method of claim 3, wherein responsive to the user providing the instruction to estimate the tare mass of the item, calculating, by the computer, the tare mass of the item as a predetermined percentage of the initial mass of the item.

8. The method of claim 1, further comprising:
    responsive to an absence of the recorded item, searching, by the computer, for a recorded similar item.

9. The method of claim 1, further comprising:
    responsive to the computer detecting a last measured mass of the item has occurred, setting, by the computer, the recorded tare mass of the item equal to a simple average, the last measured mass of the item, or $((No*Tr+Il)/(No+1))$, wherein No is a number of occurrences of the item, Tr is the recorded tare mass of the item, and Il is the last measured mass of the item.

10. The method of claim 1 wherein collecting, by the computer, the initial mass of the item and collecting, by the computer, the current mass of the item comprises:
    adding up a total increase in mass measured by a portion of a grid of mass sensors of a mass sensor shelf of the storage unit on which the item is resting.

11. The method of claim 10 wherein each dimension of surface area of each mass sensor is between one and two centimeters.

12. The method of claim 10 wherein each mass sensor of the grid of mass sensors of the mass sensor shelf of the storage unit on which the item is resting measures the mass of the item wholly or partially based on a footprint of the item.

13. A computer program product for monitoring a storage unit, the computer program product comprising:
    a computer readable storage device;
    program code, stored on the computer readable storage device, configured to detect an initial presence of an item in the storage unit and responsive to detecting the initial presence of the item in the storage unit, collect an item identification of the item, a product type of the item, and an initial mass of the item; and
    program code, stored on the computer readable storage device, configured to search a database for a recorded item containing the item identification;
    program code, stored on the computer readable storage device, configured to retrieve a total mass of the recorded item from the database;
    program code, stored on the computer readable storage device, configured to compare the initial mass of the item with the total mass of the recorded item; and
    program code, stored on the computer readable storage device, configured to set a tare mass of the item equal to a tare mass of the recorded item retrieved from the database, responsive to a difference between the initial mass of the item and the total mass of the recorded item that is less than a predetermined amount; and program code, stored on the computer readable storage device, configured to collect a current mass of the item responsive to detecting that the item has been removed and replaced in the storage unit; and program code, stored on the computer readable storage device, configured to determine a mass depletion of the item as the current mass of the item minus the tare mass of the item; and program code, stored on the computer readable storage device, configured to alert a user, responsive to the mass depletion of the item reaching a threshold depletion.

14. The computer program product of claim 13, further comprising:

program code, stored on the computer readable storage device, configured to prompt the user to confirm the identity of the item, responsive to the difference between the initial mass of the item and the total mass of the recorded item that is greater than a predetermined amount; and program code, stored on the computer readable storage device, configured to calculate the tare mass of the item as $(Tr/R_{tot})*Ii$, wherein Tr is the tare mass of the recorded item, $R_{tot}$ is the total mass of the recorded item, and Ii is the initial mass of the item, responsive to a positive confirmation of the item identity.

15. The computer program product of claim 13, further comprising:

program code, stored on the computer readable storage device, configured to prompt the user to provide a net weight of the item, an instruction to search for a similar item, or an instruction to estimate the tare mass of the item, responsive to an absence of the recorded item in the database.

16. The computer program product of claim 15, further comprising:

program code, stored on the computer readable storage device, configured to set the tare mass of the item equal to the initial mass of the item minus the net weight of the item, responsive to the user providing the net weight of the item.

17. The computer program product of claim 15, further comprising:

program code, stored on the computer readable storage device, configured to set the tare mass of the item equal to a tare mass of the similar item, responsive to finding the similar item and provided that the difference between the initial mass of the item and a total mass of the similar item is less than a predetermined amount.

18. The computer program product of claim 15, further comprising:

program code, stored on the computer readable storage device, configured to calculate a new tare mass of the item, responsive to finding the similar item and provided the difference between the initial mass of the item and the total mass of the similar item is greater than a pre-determined amount, as $((Ts/S_{tot})*Ii$, wherein Ts is the tare mass of the similar item, $S_{tot}$ is the total mass of the similar item, and Ii is the initial mass of the item.

19. The computer program product of claim 15, further comprising:

program code, stored on the computer readable storage device, configured to calculate the tare mass of the item as a predetermined percentage of the initial mass of the item, responsive to receiving the instruction to estimate the tare mass of the item.

20. The computer program product of claim 15, further comprising:

program code, stored on the computer readable storage device, configured to set the recorded tare mass of the item equal to a simple average, the last measured mass of the item, or $(No*Tr+Il)/No+1$, wherein, No is the number of occurrences of the item, Tr is the recorded tare mass of the item, and Il is the last measured mass of the item, responsive to detecting a last measured mass of the item has occurred.

21. An apparatus comprising:

a user interface;

a tag reader; and a controller, wherein the controller further comprises:

a bus;

a storage device connected to the bus, wherein the storage device contains a computer usable program product; and a processor unit, wherein the processor unit executes the computer usable program product to detect an initial presence of an item in a storage unit and responsive to detecting the initial presence of the item in the storage unit, collect an item identification of the item, a product type of the item, and an initial mass of the item; and search a database for a recorded item containing the item identification; retrieve a total mass of the recorded item from a database; compare the initial mass of the item with the total mass of the recorded item; and responsive to a difference between the initial mass of the item and the total mass of the recorded item that is less than a predetermined amount, set a tare mass of the item equal to a tare mass of the recorded item retrieved from the database; and responsive to detecting the item has been removed and replaced in the storage unit, collect a current mass of the item; and determine a mass depletion of the item as the current mass of the item minus the tare mass of the item; and responsive to the mass depletion of the item reaching a threshold depletion, alert a user.

22. The apparatus of claim 21, wherein the processor unit executes the computer usable program product to set the recorded tare mass of the item equal to a simple average, a last measured mass of the item, or $(No*Tr+Il)/No+1$, wherein, No is the number of occurrences of the item, Tr is the recorded tare mass of the item, and Il is the last measured mass of the item, responsive to detecting the last current mass of the item has occurred.

* * * * *